US012666164B2

(12) United States Patent
Luo et al.

(10) Patent No.: US 12,666,164 B2
(45) Date of Patent: Jun. 23, 2026

(54) CAMERA ASSEMBLY, WHEEL POSITIONING SYSTEM AND METHOD FOR POSITIONING WHEELS

(71) Applicant: Autel Intelligent Technology Corp., Ltd., Shenzhen (CN)

(72) Inventors: Wenhui Luo, Shenzhen (CN); Min Zeng, Shenzhen (CN); Lianjun Liu, Shenzhen (CN)

(73) Assignee: AUTEL INTELLIGENT TECHNOLOGY CORP., LTD., Shenzhen (CN)

( * ) Notice: Subject to any disclaimer, the term of this patent is extended or adjusted under 35 U.S.C. 154(b) by 416 days.

(21) Appl. No.: 18/167,873

(22) Filed: Feb. 12, 2023

(65) Prior Publication Data

US 2023/0199332 A1 Jun. 22, 2023

Related U.S. Application Data

(63) Continuation of application No. PCT/CN2021/110806, filed on Aug. 5, 2021.

(30) Foreign Application Priority Data

Aug. 13, 2020 (CN) .......................... 202010813746.X

(51) Int. Cl.
*H04N 23/90* (2023.01)
*G06T 7/73* (2017.01)
*H04N 23/51* (2023.01)

(52) U.S. Cl.
CPC ............... *H04N 23/90* (2023.01); *G06T 7/74* (2017.01); *H04N 23/51* (2023.01)

(58) Field of Classification Search
CPC ........... H04N 23/90; H04N 23/51; G06T 7/74
(Continued)

(56) References Cited

U.S. PATENT DOCUMENTS

| | | | |
|---|---|---|---|
| 5,724,128 A | 3/1998 | January | |
| 5,889,550 A | 3/1999 | Reynolds | |

(Continued)

FOREIGN PATENT DOCUMENTS

| | | |
|---|---|---|
| CN | 104316335 A | 1/2015 |
| CN | 106949857 A | 7/2017 |

(Continued)

OTHER PUBLICATIONS

The extended European search report of EP application No. 21855438.4 issued on Nov. 15, 2023.

(Continued)

*Primary Examiner* — Trang U Tran
(74) *Attorney, Agent, or Firm* — Andrew C. Cheng

(57) ABSTRACT

A camera assembly for a wheel positioning system includes a base body and a camera main body. The base body is provided with target surfaces which are not in the same plane and are not in the same plane as that of a lens in the camera main body. The target surfaces are respectively provided with target elements, the spatial positional relationship between the target element and the camera main body is known, and the geometric characteristics of the target element are known. Therefore, the position of the camera main body can be determined by acquiring the positions of the target surfaces, and the positions of cameras on two sides of a vehicle can be indirectly determined without using a sensor or a preset camera fixing structure, thereby improving the measurement accuracy of calibration calculation.

1 Claim, 4 Drawing Sheets

(58) Field of Classification Search
USPC ........................................................... 348/95
See application file for complete search history.

(56)                    References Cited

U.S. PATENT DOCUMENTS

| | | | |
|---|---|---|---|
| 6,839,972 B2 | 1/2005 | Jackson | |
| 6,931,340 B2 | 8/2005 | Jackson | |
| 7,444,752 B2 * | 11/2008 | Stieff | B60R 11/04 |
| | | | 33/203.18 |
| 7,953,247 B2 | 5/2011 | Kassouf et al. | |
| 8,401,236 B2 | 3/2013 | Kassouf et al. | |
| 8,561,307 B2 | 10/2013 | Stieff | |
| 9,644,952 B2 * | 5/2017 | Shylanski | G06T 7/97 |
| 10,347,006 B2 | 7/2019 | Kunert et al. | |
| 10,692,241 B2 | 6/2020 | Kunert et al. | |
| 10,989,624 B2 * | 4/2021 | Corghi | G01M 11/067 |
| 2002/0080343 A1 | 6/2002 | Bux | |
| 2003/0147068 A1 | 8/2003 | Corghi | |
| 2008/0289202 A1 | 11/2008 | Kassouf et al. | |
| 2009/0095047 A1 * | 4/2009 | Patel | G06K 7/015 |
| | | | 73/1.01 |
| 2011/0185584 A1 | 8/2011 | Kassouf et al. | |
| 2012/0170811 A1 | 7/2012 | Kassouf et al. | |
| 2013/0141545 A1 | 6/2013 | Macchia | |
| 2013/0222793 A1 | 8/2013 | Kassouf et al. | |
| 2018/0053320 A1 | 2/2018 | Kunert et al. | |
| 2019/0279395 A1 | 9/2019 | Kunert et al. | |
| 2019/0279396 A1 | 9/2019 | Kunert et al. | |
| 2020/0320739 A1 | 10/2020 | Kunert et al. | |

FOREIGN PATENT DOCUMENTS

| | | | |
|---|---|---|---|
| CN | 106969726 A | 7/2017 | |
| CN | 109923371 A | 6/2019 | |
| CN | 111307074 A | 6/2020 | |
| CN | 111879261 A | 11/2020 | |
| CN | 212692809 U | 3/2021 | |
| EP | 3472555 A1 | 4/2019 | |
| TW | 201809596 A | 3/2018 | |
| TW | I638977 B | 10/2018 | |
| WO | 2018035040 A1 | 2/2018 | |

OTHER PUBLICATIONS

International Search Report of PCT Patent Application No. PCT/CN2021/110806 issued on Nov. 10, 2021.

* cited by examiner

CAMERA ASSEMBLY, WHEEL POSITIONING SYSTEM AND METHOD FOR POSITIONING WHEELS

CROSS-REFERENCE TO RELATED APPLICATIONS

The present application is a continuation of International Patent Application No. PCT/CN2021/110806 filed on Aug. 5, 2021, which claims priority to the Chinese Patent Application No. 202010813746. X, entitled "Camera Assembly, Wheel Positioning System and Method for Positioning Wheels", filed on Aug. 13, 2020, to the China National Intellectual Property Administration, the entire contents of which are incorporated herein by reference.

PRIOR ART

The present application relates to the technical field of position recognition, and more particularly to a camera assembly, a wheel positioning system, and a method for positioning wheels.

BACKGROUND OF THE INVENTION

At present, a wheel positioning system is widely used in the technical field of automobile calibration. For example, the wheel positioning system can acquire a target plate mounted to a vehicle and identify the position of the target plate, and then perform calculations according to the identified result, so as to determine the position of the wheel to perform correction of the wheel position. However, the current positioning method is to identify the position of the target plate by providing cameras on two sides of the vehicle, and calculate the relative position between the tires on two sides by using a sensor or the geometric position of a preset camera fixing structure. However, using a sensor or a preset camera fixing structure to indirectly determine the positions of the cameras on two sides of the vehicle is not only cumbersome to operate, but also has a technical problem that the calibration calculation accuracy is low.

SUMMARY OF THE INVENTION

In order to solve the above-mentioned technical problem, embodiments of the present invention provide a camera assembly, a wheel positioning system and a method for positioning wheels, which can solve the technical problem of low accuracy of calibration calculation in the prior art.

The embodiments of the present invention solve the technical problem by using the following technical schemes:
  a camera assembly applied in wheel positioning, wherein the camera assembly comprises a camera main body and a base body, the camera main body is mounted to the base body, the base body is provided with at least two target surfaces, at least two of the target surfaces are not in the same plane, and at least two target surfaces are not in the same plane as a face where a lens in the camera main body is located;
  at least two target surfaces are respectively provided with a target element, a spatial positional relationship between the target element and the camera main body is known, and geometric characteristics of the target element are known;
  the target element of each of the at least two target surfaces is used for the camera apparatus to determine the position of the camera main body assembly relative to the camera assembly.

Optionally, the number of the camera main body is two, both camera main bodies being mounted to the same side of the base body.

Optionally, the base body is a three-dimensional block structure having multiple outer surfaces, wherein the outer surface of the base body is provided with at least two target surfaces.

Optionally, the target surface is a plane or a curved surface.

Optionally, at least two target surfaces are provided at a pre-set angle therebetween.

Optionally, the target element is a geometric pattern that is concave or convex on the target surface.

Optionally, the number of at least two target surfaces is two, respectively a first target surface and a second target surface, the first target surface and the second target surface are arranged in parallel, and the camera main body is located at one side of the base body.

Optionally, the camera further comprises a fixed mount, the camera main body being fixedly mounted in the fixed mount and the fixed mount being fixedly connected to the base body.

Optionally, a mounting face where the lens in the camera main body is located is perpendicular to at least one target surface.

Optionally, the number of at least two target surfaces is two, respectively a first target surface and a second target surface, an end face of the base body is provided with the first target surface and the second target surface, the base body extends outward to form a convex portion, and the convex portion is provided with a third target surface, wherein the first target surface, the second target surface, and the third target surface are provided at a pre-set angle in pairs.

The embodiments of the present invention also adopt the following technical schemes to solve the technical problem:
  a wheel positioning system applied to the four-wheel positioning of a vehicle, comprising a calibration apparatus, a camera apparatus, a processing system, and the camera assembly mentioned above;
  wherein the calibration apparatus is attached to a wheel of the vehicle, the camera assembly is provided on one side of the vehicle, a visual field range of the camera assembly is directed to the calibration apparatus on one side of the vehicle and is used for acquiring a first calibration image of the calibration apparatus on one side of the vehicle, the camera apparatus is provided on the other side of the vehicle, the visual field range of the camera apparatus is directed to the calibration apparatus on the other side of the vehicle and the camera assembly, and the camera apparatus is used for acquiring a second calibration image of the calibration apparatus on the other side of the vehicle and a camera image of the camera assembly;
  the processing system is connected to the camera assembly and the camera apparatus, respectively, the processing system being configured to determine the first position of one or more wheels on one side of the vehicle relative to the camera assembly according to a first calibration image, to determine the second position of one or more wheels on the other side of the vehicle relative to the camera apparatus according to the second calibration image, to determine a relative position of the camera assembly with respect to the camera apparatus according to the camera image, and to determine the positions of the wheels of the vehicle according to the first position, the second position, and the relative position.

Optionally, the camera image is an image comprising the target element of two target surfaces of at least three target surfaces on the camera assembly, the two target surfaces being one group of calculating units;

the processing system determines the relative position of the camera assembly with respect to the camera apparatus according to the camera image, specifically as follows:

the processing system is used for calculating position information of the camera assembly with respect to the camera apparatus according to images of the target element of at least two groups of calculating units, and comparing whether the position information is consistent, and if so, determining the relative position of the camera assembly relative to the camera apparatus according to the position information.

Optionally, the camera image is an image comprising each of at least three target surfaces on the camera assembly;

the processing system determines the relative position of the camera with respect to the camera apparatus according to the camera image, specifically: screening out images of at least two target surfaces, and determining the relative position of the camera with respect to the camera apparatus according to the images of the at least two target surfaces.

The embodiments of the present invention also adopt the following technical schemes to solve the technical problem:

a method for vehicle wheel positioning, applied to a vehicle positioning system, wherein the vehicle positioning system comprises a calibration apparatus, a camera apparatus, and the camera assembly mentioned above, the calibration apparatus being attached to the wheel, the calibration apparatus being attached to the wheel of the vehicle, the camera assembly being provided on one side of the vehicle, and the camera apparatus being provided on the other side of the vehicle, and wherein the method comprises:

acquiring a first calibration image, acquired by the camera assembly, of the calibration apparatus on one side of the vehicle;

determining a first position of one or more wheels on one side of the vehicle relative to the camera assembly according to the first calibration image;

acquiring a second calibration image, acquired by the camera apparatus, of the calibration apparatus on the other side of the vehicle, and a camera image of the camera assembly;

determining a second position of one or more wheels on the other side of the vehicle relative to the camera apparatus according to the second calibration image;

determining a relative position of the camera assembly with respect to the camera apparatus according to the camera image;

and determining the positions of the wheels of the vehicle according to the first position, the second position, and the relative position.

Optionally, the camera image is an image comprising the target element of two target surfaces of at least three target surfaces on the camera assembly, the two target surfaces being one group of calculating units;

a step of determining a relative position of the camera assembly with respect to the camera apparatus according to the camera image, further comprises:

calculating position information of the camera assembly relative to the camera apparatus according to images of the target element of at least two groups of the calculating units;

and comparing whether the position information is consistent;

and if so, determining the relative position of the camera assembly with respect to the camera apparatus according to the position information.

Optionally, the camera image is an image comprising each of at least three target surfaces on the camera assembly;

a step of determining a relative position of the camera assembly with respect to the camera apparatus according to the camera image, further comprises:

screening out images of at least two target surfaces from at least three target surfaces;

and determining the relative position of the camera assembly relative to the camera apparatus according to the images of at least two target surfaces.

Advantageous effects of embodiments of the present invention are as follows: the camera assembly provided by the present invention comprises a base body and a camera main body, wherein the base body is provided with at least two target surfaces, the at least two target surfaces not being in the same plane, and at least two target surfaces are not in the same plane as the face where the lens in the camera main body is located; at least two target surfaces are respectively provided with a target element, the spatial positional relationship between the target element and the camera main body is known, and the geometric characteristics of the target element are known. Therefore, the position of the camera main body (20) can be determined by acquiring the positions of the target surfaces (13, 14), and the positions of cameras on two sides of a vehicle can be indirectly determined without using a sensor or a preset camera fixing structure, thereby improving the measurement accuracy of calibration calculation.

BRIEF DESCRIPTION OF DRAWINGS

One or more embodiments are illustrated exemplarily by the pictures in the corresponding accompanying drawings. These exemplary descriptions do not constitute a limitation on embodiments. Elements with the same reference numerals in the accompanying drawings are represented as similar elements. Unless otherwise stated, the drawings in the accompanying drawings do not constitute a limitation on the scales.

DETAILED DESCRIPTION OF THE INVENTION

Figure 1:
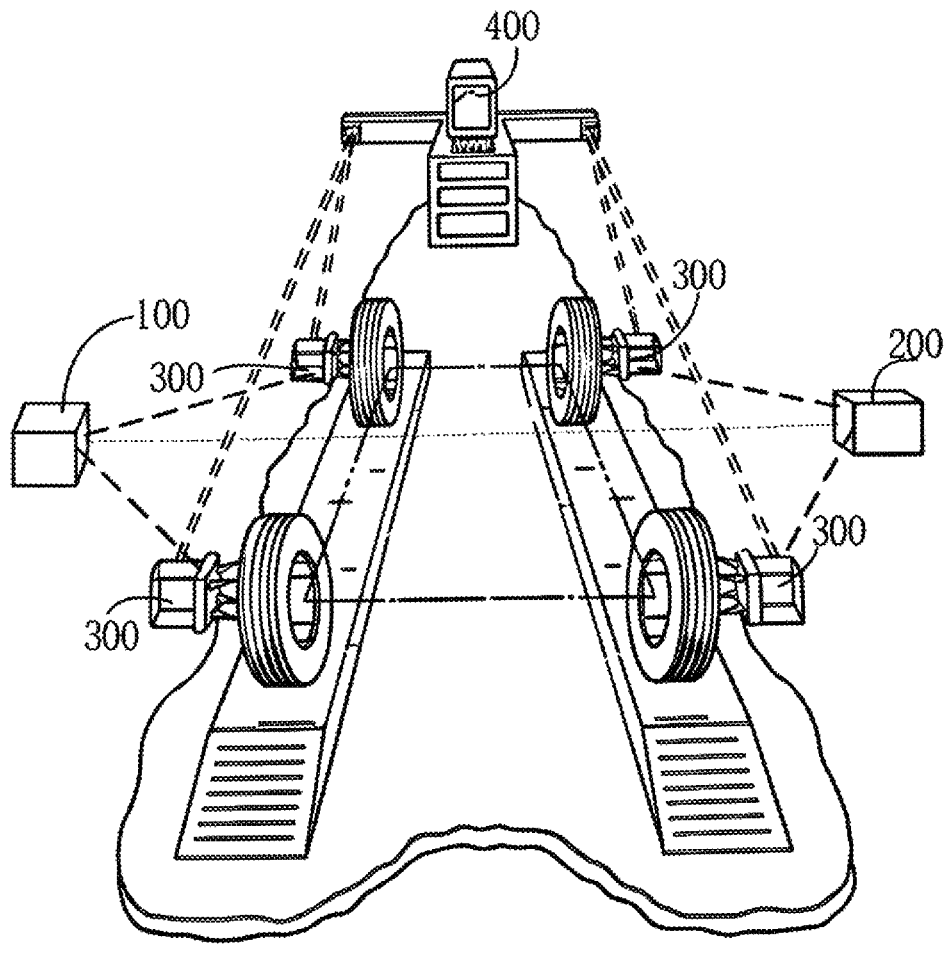
FIG. 1 is a schematic view of an application scenario of a camera assembly provided by one of the embodiments of the present invention.

In order to make the present invention readily understood, a more particular description of the invention will be rendered by reference to accompanying drawings and specific embodiments. It needs to be noted that when an element is referred to as being "secured" to another element, it can be directly on another element or one or more intervening elements may be present in between. When one element is referred to as being "connected" to another element, it can be directly connected to another element or one or more intervening elements may be present in between. As used in the description, the orientations or positional relationships indicated by the terms "up", "down", "inside", "outside", "vertical", "horizontal" and the like are based on the orientations or positional relationships shown in the drawings for purposes of describing the invention and simplifying the description only, and are not intended to indicate or imply that the referenced apparatus or element must have a particular orientation or be constructed and operated in a particular orientation. It is therefore not to be understood as limiting the invention. Furthermore, the terms "first", "second", and the like are used for descriptive purposes only and are not to be construed as indicating or implying relative importance.

Unless defined otherwise, all technical and scientific terms used herein have the same meaning as commonly understood by one of ordinary skill in the art to which this invention belongs. The terminology used herein in the description of the invention herein is for the purpose of describing particular embodiments only and is not to be limiting of the present invention. As used herein, the term "and/or" includes any and all combinations of one or more of the associated listed items.

Further, the technical features involved in different embodiments of the present invention described below can be combined with each other as long as they do not conflict with each other.

Referring to FIGS. 1-4, an embodiment of the present invention provides a camera assembly 100. The camera assembly 100 is applicable to a wheel positioning system. For example, as shown in FIG. 1, the wheel positioning system includes the camera assembly 100, a camera apparatus 200, a calibration apparatus 300, and a processing system 400. The calibration apparatus 300 is attached to a wheel of the vehicle, the camera assembly 100 is provided on one side of the vehicle, the visual field range of the camera assembly faces the calibration apparatus 300 on one side of the vehicle, and the camera assembly 100 is used to collect the first calibration image of the calibration apparatus 300 on one side of the vehicle; the camera apparatus 200 is provided on the other side of the vehicle, the visual field range of the camera apparatus 200 faces the calibration apparatus 300 and the camera assembly 100 on the other side of the vehicle, and the camera apparatus 200 is used to collect the second calibration image of the calibration apparatus 300 and the camera image of the camera assembly 100 on the other side of the vehicle. The processing system 400 is connected to the camera assembly 100 and the camera apparatus 200, respectively. The processing system 400 is used for determining the first position of a wheel on one side of the vehicle with respect to the camera assembly 100 according to the first calibration image, determining the second position of a wheel on the other side of the vehicle with respect to the camera apparatus 200 according to the second calibration image, determining a relative position of the camera assembly with respect to the camera apparatus 200 according to the camera image, and determining a position of a wheel of the vehicle according to the first position, the second position, and the relative position.

The First Embodiment

Figure 2:
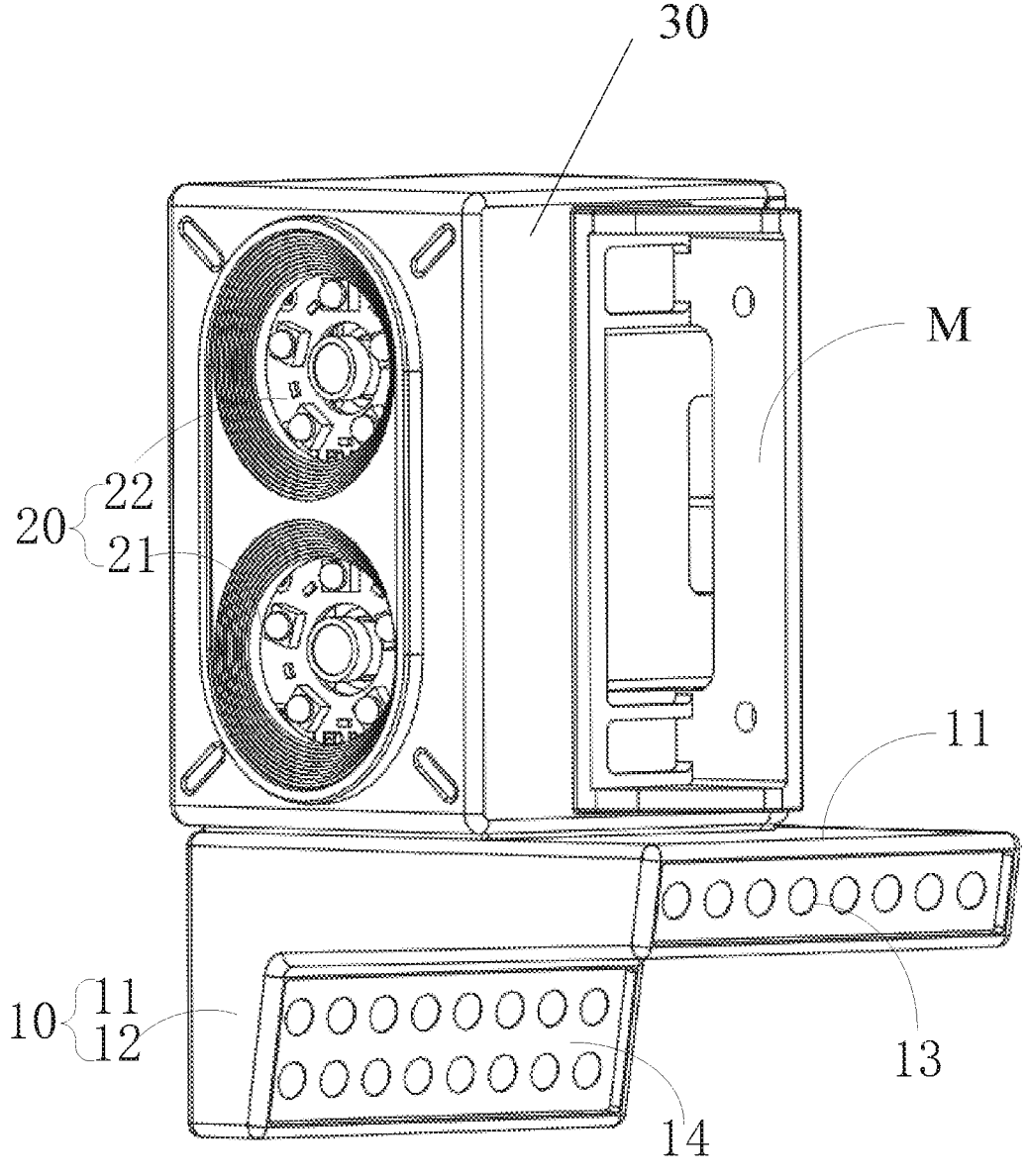
FIG. 2 is a schematic structural view of a camera assembly provided by one of the embodiments of the present invention.

As shown in FIGS. 1-2, the camera assembly 100 includes a base body 10 and a camera main body 20 mounted to the base body 10, wherein the base body 10 is provided with at least two target surfaces, at least two of the target surfaces are not in the same plane, and at least two of the target surfaces are not in the same plane as the surface where the lens in the camera main body is located. At least two target surfaces are respectively provided with a target element 16, the spatial positional relationship between the target element 16 and the camera main body 20 is known, and the geometric characteristics of the target element 16 are known. The target element 16 on the target surface can be used for the camera apparatus 200 to collect an image, and the target element 16 may be a concave or convex geometry. In this embodiment, the target element 16 is a circular spot that is concave on the target surface. It could be appreciated that at least two target surfaces are not in the same plane, and may be arranged parallel to each other or at a predetermined angle therebetween. It should be understood that the target element 16 may also be in the shape of a polygon, such as a triangle, other geometric shapes, or even a combination of several geometric shapes, in addition to being a circular spot.

In the present embodiment, the target surface on the base body 10 protrudes outward so that the image data of the target elements 16 located on the target surface can be acquired more easily by the camera apparatus 200. At least two target surfaces can be directed in multiple directions, respectively, and at least three target surfaces are not in the same plane, thereby enabling the base body 10 to be adapted to multiple collection viewing angles. Therefore, the image camera apparatus 200 can easily acquire image data.

For example, when the camera assembly 100 is provided around a wheel on one side of a vehicle and the visual field range of the camera main body 20 is directed toward the wheel on one side of a vehicle, the camera apparatus 200 may collect the target element 16 of the target surface in the base body 10 from multiple positions, without needing to be directly in front of the visual field range of the camera main body 20, as long as it is ensured that the camera apparatus 200 can collect the target element 16 of at least one target surface. Further, since the positional relationship between each of the target surfaces and the camera main body 20 is known, the camera apparatus 200 can get to know the position of the camera main body 20 by indirectly collecting the target element 16. It could be understood that when a portion of the target surface on the base body 10 is obscured, the remaining visible target element 16 on the target surface can still meet the collected and calculation requirements. Therefore, the wheel positioning system improves the accuracy of positioning by collecting and calculating the target element 16 of multiple target surfaces.

It could be understood that when the base body 10 is provided with at least three target surfaces, two target surfaces may be grouped together so that at least three target surfaces may be divided into multiple groups. The processing system 400 performs the comparison and check computation according to numerical values calculated by different groups of the target surfaces. If the position information about the camera main body 20 calculated according to each group of the target surfaces is consistent or less than a preset error range, no structural variation occurs to the target surface of the base body 10 and no inaccurate measurement is resulted in. The camera assembly 100 is in a normal state at this moment. Otherwise, if the position information of the camera main body 20 calculated by each group of the target surfaces is inconsistent or less than a preset error range, the target surface of the base body 10 has undergone structural variation, such as aging deformation or impact deformation of the target surface. At this time, the camera assembly 100 is in an abnormal state, and the target surface of the base body 10 should be replaced or re-calibrated back to a factory.

Specifically, in the present embodiment, the number of at least two target surfaces is two, respectively a first target surface 13 and a second target surface 14. The outer shape of the base body 10 is L-shaped, the base body 10 comprises a first step portion 11 and a second step portion 12, one end face of the first step portion 11 is provided with the first target surface 13, one end face of the second step portion 12 is provided with the second target surface 14, the first target 13 and the second target surface 14 are arranged in parallel, and both the first target surface 13 and the second target surface 14 face the same direction. The camera main body 20 is mounted to one end face of the first step portion 11, and the surface where the lens of the camera main body 20 is located is provided at a preset angle to the first target surface 13 and the second target surface 14.

As could be understood, in some embodiments, the rest end faces of the first step portion 11 and the second step portion 12 may each be provided with a target surface, and a target element may be provided on these target surfaces correspondingly, i.e. the base body 10 may be added with a third target surface, even a fourth target surface, etc. as needed, so that the camera apparatus 200 can collect images of part of the target surfaces of the first step portion 11 and the second step portion 12 from more angles, thereby determining the positional relationship of the camera main body 20 with respect to the camera apparatus 200.

In some embodiments, the number of the camera main body 20 is two, respectively a first camera main body 21 and a second camera main body 22. The first camera main body 21 and the second camera main body 22 are both fixedly mounted to one side end of the first step portion 11, and the lens of the first camera main body 21 and the lens of the second camera main body 22 are both facing the same direction, so as to collect an image of the calibration apparatus mounted to a wheel. In some other embodiments, the central axis of the lens of the first camera main body 21 and the central axis of the lens of the second camera main body 22 are provided at a preset angle, for example, the case where the central axis of the lens of the first camera main body 21 and the central axis of the lens of the second camera main body 22 are perpendicular to each other, in that case, one of the first camera main body 21 and the second camera main body 22 may be used to identify the calibration apparatus 300 mounted to one side wheel of the vehicle, and the other may be used to collect the position of the camera apparatus 200 and transmit it to the processing system 400.

In some embodiments, the camera assembly 100 further includes a fixed mount 30 to which the camera main body 20 is fixedly mounted, the fixed mount 30 being connected to the base body 10. Optionally, a mounting face M where the lens in the camera main body is located is perpendicular to at least one target surface.

Figure 3:
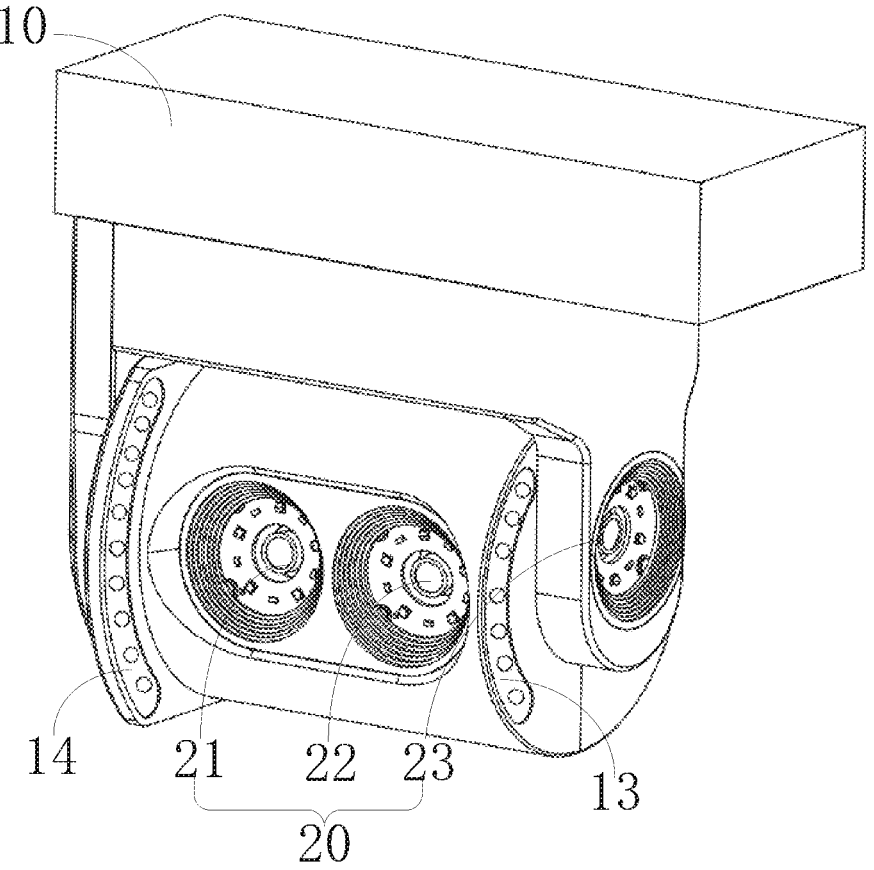
FIG. 3 is a schematic structural view of a camera assembly provided by another embodiment of the present invention.

In some other embodiments, as shown in FIG. 3, the camera assembly 100 includes a base body 10 and a camera main body 20 mounted to the base body 10. The base body 10 is provided with a first target surface 13 and a second target surface 14, the first target surface 13 and the second target surface 14 are both provided with a target element 16, and the first target surface 13 and the second target surface 14 are parallel to each other. The camera main body 20 comprises a first camera main body 21, a second camera main body 22, and a third camera main body 23. The first camera main body 21 and the second camera main body 22 are mounted to the base body 10 in parallel, and the lens orientations of the first camera main body 21 and the second camera main body 22 are the same, namely, the visual field range of the first camera main body 21 and the visual field range of the second camera main body 22 are the same, and the central axis of the third camera main body 23 is perpendicular to the central axes of the first camera main body 21 and the second camera main body 22, respectively so that the third camera main body 23 can collect images different from the first camera main body 21 and the second camera main body 22. It could be understood that, in use, when the first camera main body 21 and the second camera main body 22 are used to collect an image of the calibration apparatus 300, the third camera main body 23 may be used to collect other images, such as an image of the camera apparatus 200. Therefore, the wheel positioning system can be more accurately positioned by providing a camera main body of different visual field ranges and view angles.

The Second Embodiment

Figure 4:
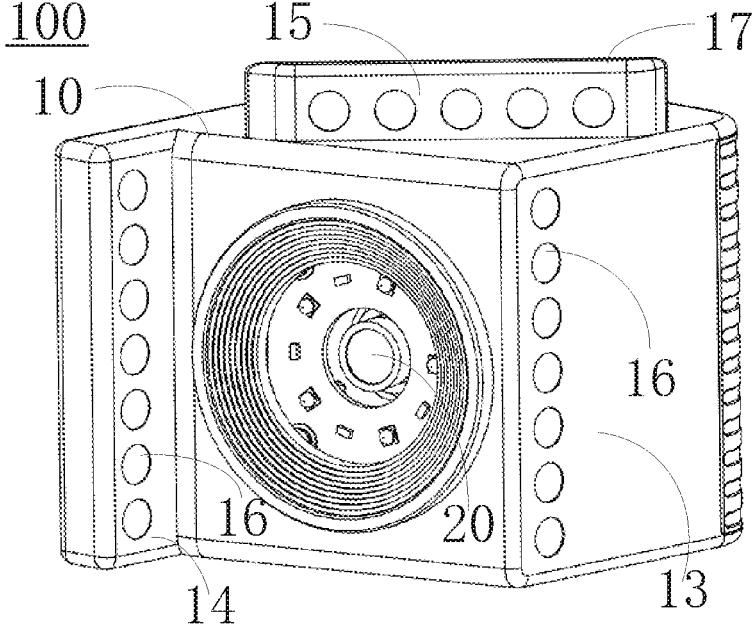
FIG. 4 is a schematic structural view of a camera assembly provided by yet another embodiment of the present invention.

As shown in FIG. 4, the camera assembly 100 includes a base body 10 and a camera main body 20 mounted to the base body 10. The base body 10 is provided with at least three target surfaces, the at least three target surfaces not being in the same plane, and at least two target surfaces are not in the same plane as the face where the lens in the camera main body 20 is located; at least two target surfaces are respectively provided with a target element 16, the spatial positional relationship between the target element 16 and the camera main body 20 is known, and the geometric characteristics of the target element 16 are known. For example, the target surfaces are arranged at a preset angle, and the target surfaces are provided with a target element 16 whose image is to be collected, the target element 16 being concave or convex geometric shapes. In this embodiment, the target element 16 is a circular spot that is concave on the target surface.

It could be appreciated that at least two target surfaces are not in the same plane, and may be arranged parallel to each other or at a predetermined angle therebetween. It should be understood that the target element 16 may also be in the shape of a polygon, such as a triangle, other geometric shapes, or even a combination of several geometric shapes, in addition to being a circular spot.

In the present embodiment, the target surface on the base body 10 protrudes outward so that the image data of the target elements 16 located on the target surface can be acquired more easily by the camera apparatus 200. At least two target surfaces can be directed in multiple directions, respectively, and at least three target surfaces are not in the same plane, thereby enabling the base body 10 to be adapted to multiple collection viewing angles. Therefore, the image camera apparatus 200 can easily acquire image data.

For example, when the camera assembly 100 is provided around a wheel on one side of a vehicle and the visual field range of the camera main body 20 is directed toward the wheel on one side of a vehicle, the camera apparatus 200 may collect the target element 16 of the target surface in the base body 10 from multiple positions, without needing the camera apparatus 200 to be directly in front of the visual field range of the camera main body 20, as long as it is ensured that the camera apparatus 200 can collect the target element 16 of at least one target surface. Further, since the positional relationship between each of the target surfaces and the camera main body 20 is known, the camera apparatus 200 can get to know the position of the camera main body 20 by indirectly collecting the target element 16. It could be understood that when a portion of the target surface on the base body 10 is obscured, the remaining visible target element 16 on the target surface can still meet the collected and calculation requirements. Therefore, the wheel positioning system improves the accuracy of positioning by collecting and calculating the target element 16 of multiple target surfaces.

It could be understood that when the base body 10 is provided with at least three target surfaces, two target surfaces may be grouped together so that at least three target surfaces may be divided into multiple groups. The processing system 400 performs the comparison and check computation according to numerical values calculated by different groups of the target surfaces. If the position information about the camera main body 20 calculated according to each group of the target surfaces is consistent or less than a preset error range, no structural variation occurs to the target surface of the base body 10 and no inaccurate measurement is resulted in. The camera assembly 100 is in a normal state at this moment. Otherwise, if the position information of the camera main body 20 calculated by each group of the target surfaces is inconsistent or less than a preset error range, the target surface of the base body 10 has undergone structural variation, such as aging deformation or impact deformation of the target surface. At this time, the camera assembly 100 is in an abnormal state, and the target surface of the base body 10 should be replaced or re-calibrated back to a factory.

Specifically, in the present embodiment, the number of at least three target surfaces is three, respectively a first target surface 13, a second target surface 14, and a third target surface 15. The base body 10 is a three-dimensional block having multiple outer surfaces, and the base body 10 comprises a main body and an epitaxial block. The main body is connected to the epitaxial block, one end face of the main body is provided with the first target surface 13, the epitaxial block is provided with the second target surface 14, the base body extends outward to form a convex portion 17, and the convex portion 17 is provided with the third target surface 15, wherein the first target surface 13, the second target surface 14, and the third target surface 15 are arranged at a preset angle in pairs.

It could be understood that the camera apparatus 200 may be the same structure as the camera assembly 100, may also be an ordinary camera, and may of course also be other apparatuses for collecting an image as long as the position image of the camera assembly 100 can be collected.

It should be understood that the above-described calibration apparatus 300, which is a target plate, is correspondingly provided with a marker element for positioning. The marker element may be a geometric shape such as a circle, a triangle, or a trapezoid, etc. through which the position of the wheel can be known by the camera assembly 100 and the camera apparatus 200.

Based on the camera assembly 100 of the above-described embodiment, in combination with the application scenario shown in FIG. 1, a wheel positioning system is proposed, including the camera assembly 100, the camera apparatus 200, the calibration apparatus 300, and a processing system 400.

The calibration apparatus 300 is attached to a wheel of the vehicle, the camera assembly 100 is arranged on one side of the vehicle, the visual field range of the camera assembly 100 faces the calibration apparatus 300 on one side of the vehicle, and is used for collecting a first calibration image of the calibration apparatus 300 on one side of the vehicle, the camera assembly 200 is arranged on the other side of the vehicle, the visual field range of the camera assembly 200 faces the calibration apparatus 300 on the other side of the vehicle and the camera assembly 100, and the camera apparatus 200 is used for collecting a second calibration image of the calibration apparatus 300 on the other side of the vehicle and a camera image of the camera assembly 100;

the processing system 400 is connected to the camera assembly 100 and the camera apparatus 300, respectively; the processing system 400 is used for determining the first position of a wheel on one side of the vehicle with respect to the camera assembly 100 according to the first calibration image, determining the second position of a wheel on the other side of the vehicle with respect to the camera apparatus 200 according to the second calibration image, determining a relative position of the camera assembly 100 with respect to the camera apparatus 200 according to the camera image, and determining a position of a wheel of the vehicle according to the first position, the second position, and the relative position.

In further embodiments, taking two target surfaces as one group of calculating units, the processing system 400 is further configured to calculate at least two position information of the camera main body 20 according to the images of the target elements 16 of at least two groups of the calculating units; and to compare whether the at least two position information is consistent, and if so, the position of the camera main body 20 relative to the camera apparatus 200 is determined according to the position information.

For example, the camera apparatus 200 acquires an image of the camera assembly 100 and feeds back the same to the processing system 400. The processing system 400 identifies and screens out the first target surface 13, the second target surface 14, and the third target surface (not shown). At this time, the first target surface 13 and the second target surface 14 can be taken as the first group, and the first target surface 13 and the third target surface can be taken as the second group; if the position information about the camera main body 20 calculated according to the first group of the target surfaces is consistent with the position information about the camera main body 20 calculated according to the second group of the target surfaces or is less than a preset error range, it indicates that the camera assembly 100 complies with a factory state, and the target surface on the camera assembly 100 does not have a structural variation that causes measurement inaccuracy.

If some of the target surfaces are covered, e.g. the third target surface is partially covered, the target element located on the third target surface cannot be recognized by the processing system 400, and therefore, the processing system 400 can only recognize and obtain image data for the first target surface 13 and the second target surface 14. When the camera assembly 100 is placed on one side of the vehicle, some of the target surfaces will be blocked. But some of the target surfaces will be prominent so that the image data thereof are easily collected. Through reasonable design, even if there are individual target surfaces blocked, the remaining target element 16 on the visible target surface can still meet the requirements for collection and calculation. Therefore, the wheel positioning system improves the accuracy of positioning by collecting and calculating the target element 16 of multiple target surfaces.

Based on the wheel positioning system described above, a method for vehicle wheel positioning is proposed. Specifically, the calibration apparatus 300 is attached to a wheel of the vehicle, the camera assembly is provided on one side of the vehicle, and the camera apparatus is provided on the other side of the vehicle. The specific steps are:

acquiring a first calibration image, acquired by the camera assembly 100, of the calibration apparatus 300 on one side of the vehicle; determining a first position of a wheel on one side of the vehicle relative to the camera assembly 100 according to the first calibration image; acquiring a second calibration image, acquired by the camera apparatus 200, of the calibration apparatus 300 on the other side of the vehicle, and a camera image of the camera assembly 100; determining the second position of a wheel on the other side of the vehicle relative to the camera apparatus 200 according to the second calibration image; determining a relative position of the camera assembly 100 with respect to the camera apparatus 200 according to the camera image; and determining a position of the vehicle wheel according to the first position, the second position, and the relative position.

Further, the step of determining the relative position of the camera assembly with respect to the camera apparatus according to the camera image further comprises: calculating position information of the camera assembly relative to the camera apparatus according to images of the target element of at least two groups of calculating units; and comparing whether the position information is consistent; and if so, determining the relative position of the camera assembly with respect to the camera apparatus according to the position information.

In another embodiment, the step of determining the relative position of the camera assembly with respect to the camera apparatus according to the camera image further comprises: screening out images of at least two target surfaces from at least three target surfaces; and determining a relative position of the camera assembly relative to the camera apparatus according to the images of the at least two target surfaces.

The camera image is an image including the target element 16 of two target surfaces of the at least three target surfaces on the camera assembly 100, the two target surfaces being a group of calculating units.

For example, the camera assembly 100 collects a first calibration image of a calibration apparatus on one side of the vehicle and feeds back the same to the processing system 400, and the camera apparatus 200 collects a second calibration image of a calibration apparatus on the other side of the vehicle and a camera image of the camera assembly 100 and feeds back the same to the processing system 400. The processing system 400 determines the relative position of the camera assembly 100 with respect to the camera apparatus 200 according to the camera image, and determines a position of a wheel of the vehicle according to the relative position, the first position, and the second position.

In summary, in the camera assembly 100 of an embodiment of the present invention, the base body 10 is provided with at least two target surfaces that are not in the same plane, the target surfaces being provided with a target element 16 for calibration. Therefore, the positional relationship between the camera main body 20 and the camera apparatus 200 can be determined by the target element 16 on the target surface of the base body 10 to enhance the accuracy of the calibration calculation. In addition, when at least three target surfaces are provided, every two target surfaces form one group to form multiple groups of combinations, and the position information of the camera main body is known through multiple groups of combinations and compared so that it can be judged whether the target surface on the camera assembly 100 also meets the requirements of accurate calibration. Therefore, the failed target surface on the camera assembly 100 can be replaced in time or repaired.

The above-mentioned description is merely an implementation mode of the present invention, and does not limit the scope of the present invention. Any equivalent structure or equivalent process change made by using the contents of the description and the drawings of the present invention or directly or indirectly used in other relevant technical fields is likewise included in the scope of protection of the present invention.

The invention claimed is:

1. A method for vehicle wheel positioning, applied to a vehicle positioning system, wherein the vehicle positioning system comprises calibration apparatuses, a camera apparatus, and a camera assembly, the calibration apparatuses being attached to wheels of the vehicle respectively, the camera assembly being provided on one side of the vehicle, and the camera apparatus being provided on the other side of the vehicle, and wherein the method comprises:

acquiring a first calibration image, acquired by the camera assembly, of the calibration apparatus on one side of the vehicle;

determining a first position of the wheels on one side of the vehicle relative to the camera assembly according to the first calibration image;

acquiring a second calibration image, acquired by the camera apparatus, of the calibration apparatus on the other side of the vehicle, and a camera image of the camera assembly;

determining a second position of the wheels on the other side of the vehicle relative to the camera apparatus according to the second calibration image;

determining a relative position of the camera assembly with respect to the camera apparatus according to the camera image;

and determining positions of the wheels of the vehicle according to the first position, the second position, and the relative position;

wherein the camera assembly comprises at least one camera main body and a base body, the base body is provided with at least two target surfaces, the at least two target surfaces are not in a same plane, and the at least two target surfaces are not in the same plane as a face where a lens in the camera main body is located;

the at least two target surfaces each is provided with a target element, a spatial positional relationship between the target element and the camera main body is known, and geometric characteristics of the target element are known; and the target element of each of the at least two target surfaces is used for a camera apparatus to determine a position of the camera assembly.

\* \* \* \* \*